United States Patent
Smith

(10) Patent No.: US 7,372,482 B2
(45) Date of Patent: May 13, 2008

(54) SYSTEM AND METHOD OF CAPTURING AND PROVIDING SUPPLEMENTAL DATA ASSOCIATED WITH A DIGITAL IMAGE

(75) Inventor: Greg S. Smith, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1001 days.

(21) Appl. No.: 10/410,676

(22) Filed: Mar. 28, 2003

(65) Prior Publication Data

US 2004/0189807 A1   Sep. 30, 2004

(51) Int. Cl.
H04N 1/04   (2006.01)

(52) U.S. Cl. .............. 348/207.2; 382/305; 283/75; 396/310

(58) Field of Classification Search ............ 348/207.2; 355/24, 40, 26; 283/72, 74
See application file for complete search history.

(56) References Cited

U.S. PATENT DOCUMENTS

| | | | |
|---|---|---|---|
| 3,263,555 A | 8/1966 | Scheib | 355/43 |
| 3,402,651 A | 9/1968 | Pieronek et al. | 355/41 |
| 3,516,741 A | 6/1970 | Thaddey | 355/88 |
| 3,576,369 A | 4/1971 | Wick et al. | 355/77 |
| 3,881,820 A | 5/1975 | Muir | 355/41 |
| 4,823,163 A | 4/1989 | Rollet et al. | 355/41 |
| 5,023,655 A | 6/1991 | Hicks | 355/39 |
| 5,913,542 A * | 6/1999 | Belucci et al. | 283/75 |
| 5,984,445 A | 11/1999 | Morita et al. | 347/2 |
| 6,141,482 A * | 10/2000 | Massarksy | 386/46 |
| 6,181,409 B1 * | 1/2001 | Calhoun | 355/39 |
| 6,381,418 B1 * | 4/2002 | Spurr et al. | 396/310 |
| 6,483,570 B1 * | 11/2002 | Slater et al. | 355/40 |
| 6,513,710 B1 * | 2/2003 | Haas | 235/380 |
| 6,536,665 B1 * | 3/2003 | Ray et al. | 235/380 |
| 6,646,754 B1 * | 11/2003 | Redd et al. | 358/1.13 |
| 6,657,702 B1 * | 12/2003 | Chui et al. | 355/40 |
| 6,786,655 B2 * | 9/2004 | Cook et al. | 396/569 |
| 6,833,861 B2 * | 12/2004 | Matsumoto et al. | 348/207.2 |
| 6,845,913 B2 * | 1/2005 | Madding et al. | 235/462.13 |
| 6,900,882 B2 * | 5/2005 | Iida | 355/77 |
| 7,013,052 B1 * | 3/2006 | Takaoka | 382/307 |
| 7,028,884 B2 * | 4/2006 | Nyfelt | 235/375 |
| 7,044,379 B2 * | 5/2006 | Nakanishi et al. | 235/462.01 |
| 2002/0130942 A1 | 9/2002 | Walker et al. | |
| 2004/0088587 A1 * | 5/2004 | Ramaswamy et al. | 713/202 |

* cited by examiner

*Primary Examiner*—David Ometz
*Assistant Examiner*—Pritham D. Prabhakher

(57) ABSTRACT

A method and system of capturing an image comprises extracting image characterization information from an image file, extracting digital image data from the image file, printing a visually perceptible image described by the digital image data on one side of a medium, printing a visually perceptible representation of the image characterization information on an opposite side of the medium, and retrieving the image characterization information from the visually perceptible representation of the image characterization information on the opposite side of the medium.

23 Claims, 5 Drawing Sheets

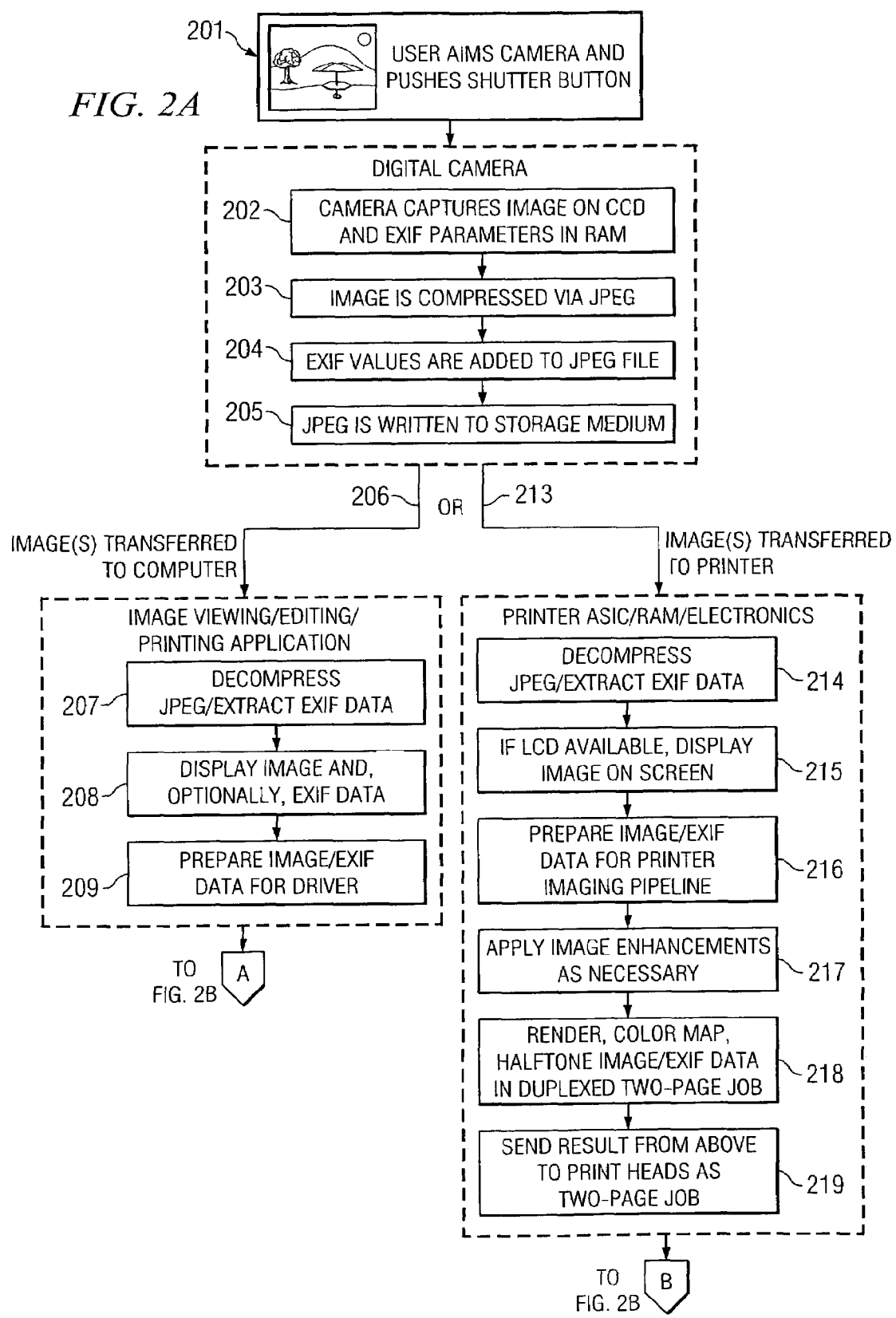

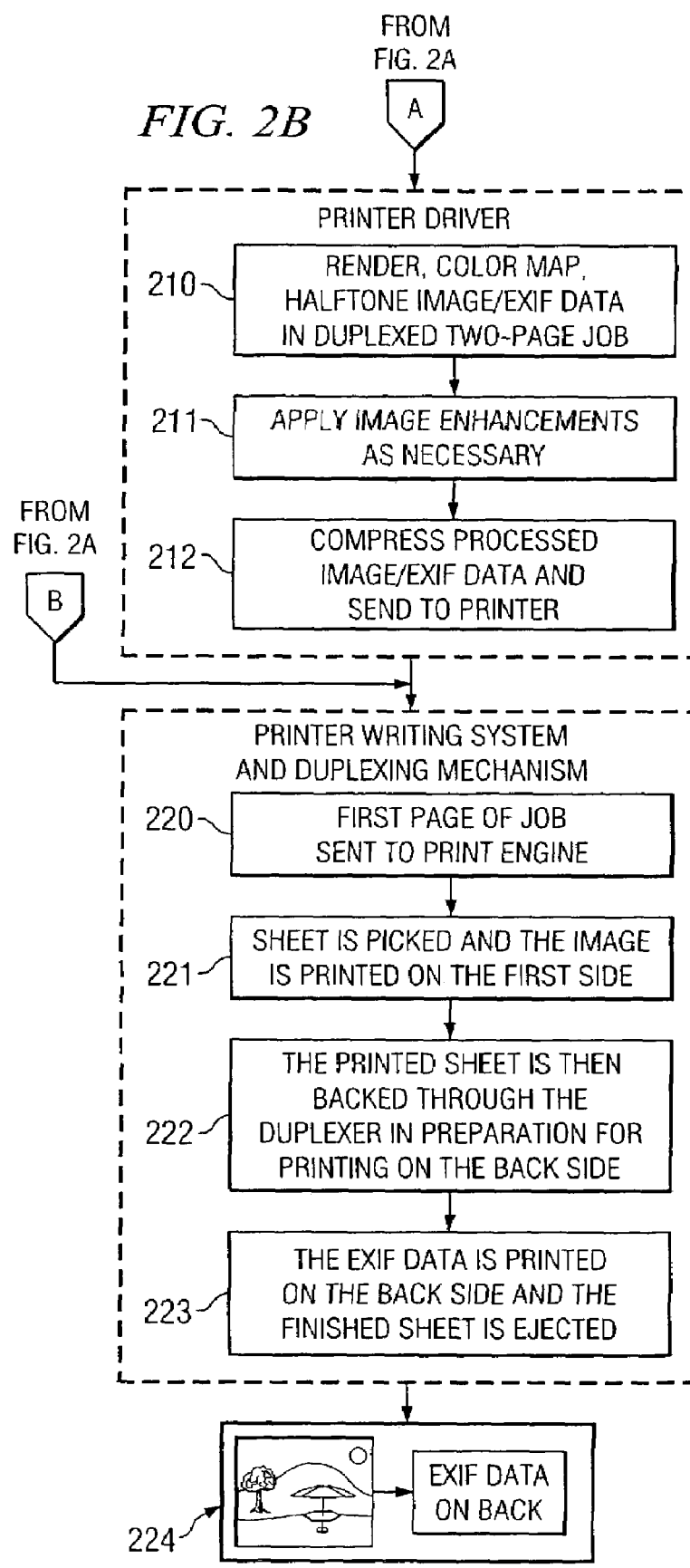

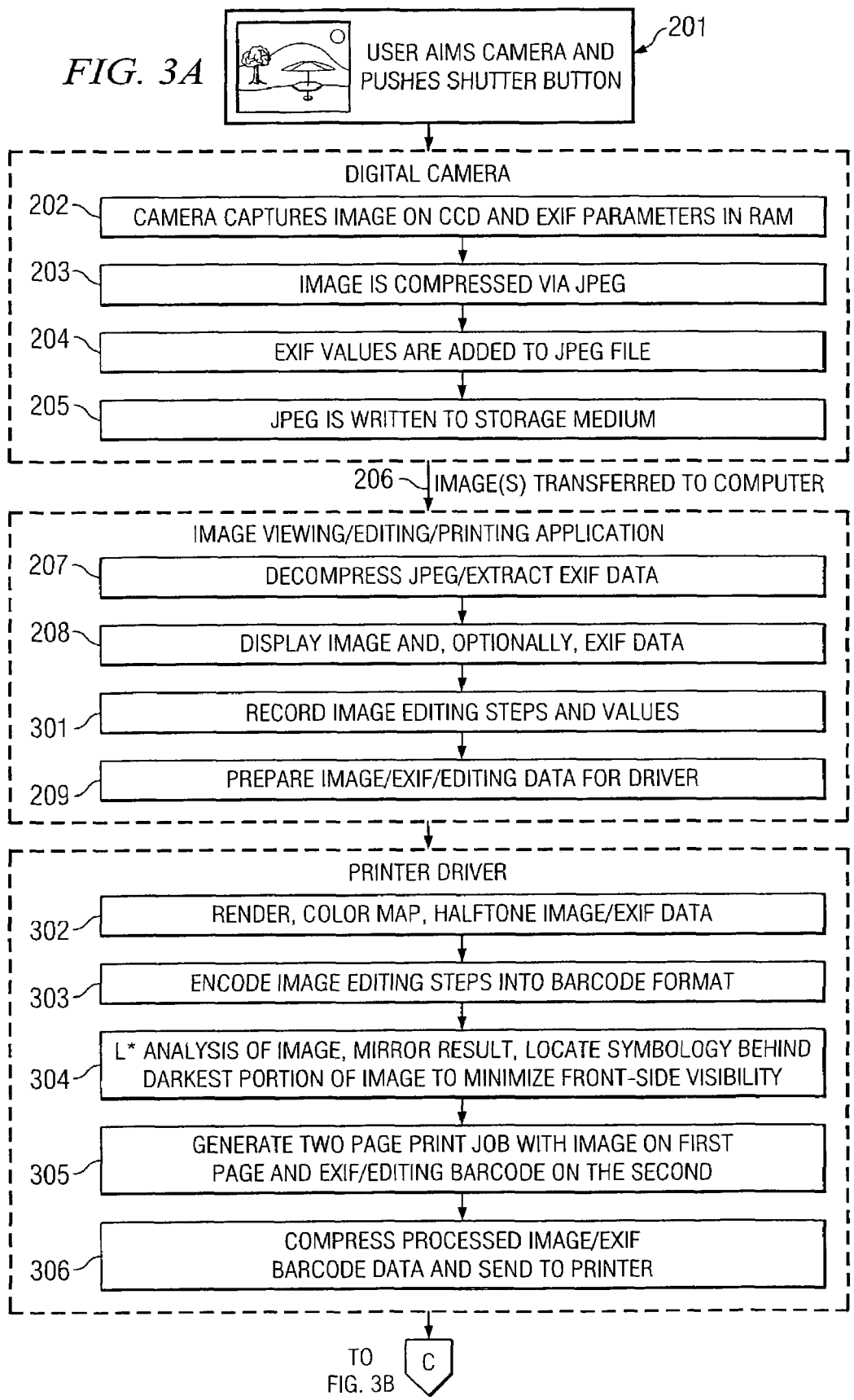

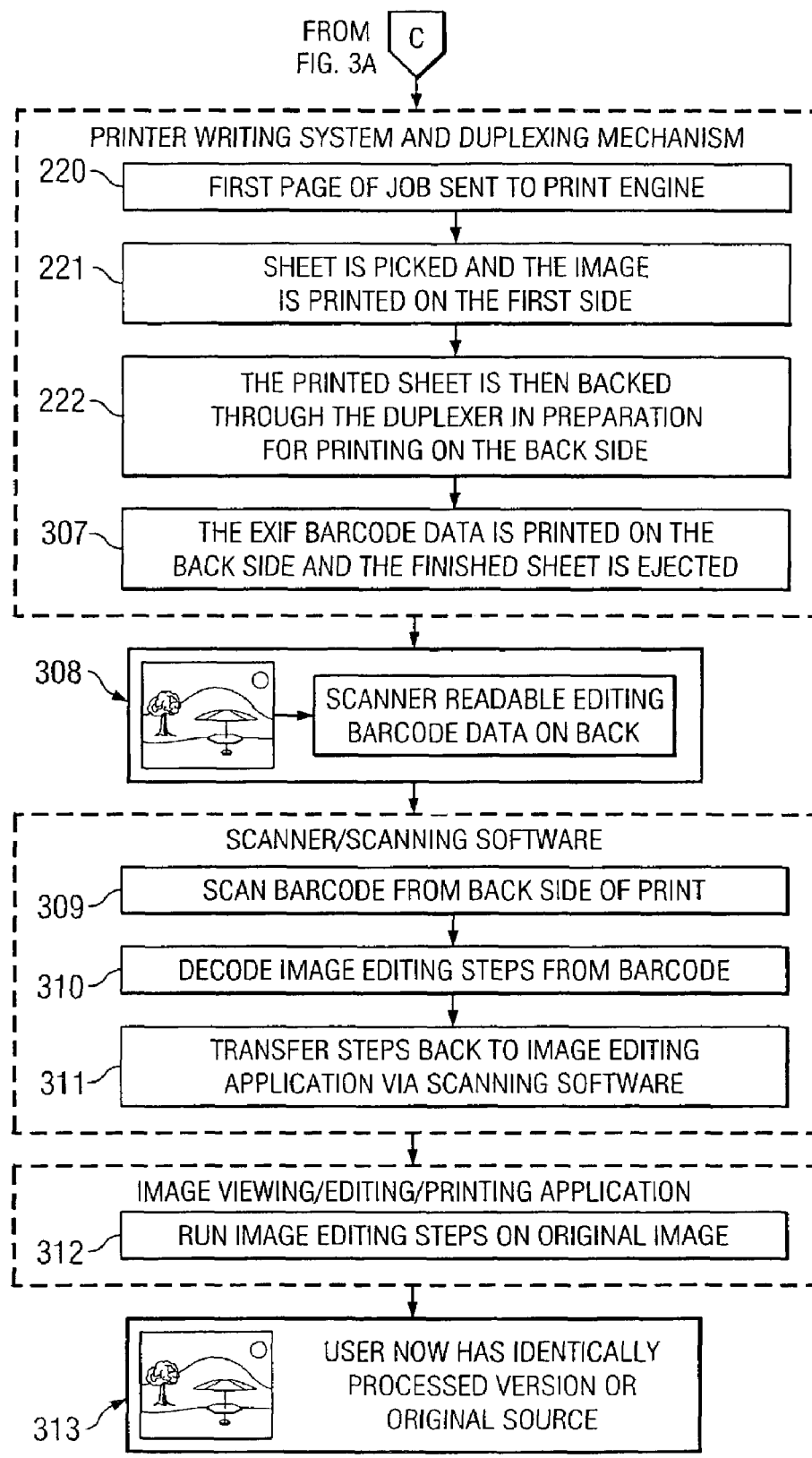

SYSTEM AND METHOD OF CAPTURING AND PROVIDING SUPPLEMENTAL DATA ASSOCIATED WITH A DIGITAL IMAGE

FIELD OF THE INVENTION

The invention relates to digital photography and more particularly to printing information associated with a digital image on same media on which a visually perceptible embodiment of the image is printed.

DESCRIPTION OF RELATED ART

Traditional photographic techniques have until recently relied upon projection of a visual image onto a chemically photosensitized medium, such as a silver halide compound coating formed on a roll of plastic film. The exposed photographic film is chemically processed to develop a latent image into a negative image on the film (a "negative"). The negative is then used to make one or more "prints" or enlargements of the image on a similar paper-backed photosensitive medium. During such processing, it is common to print certain identifying information on the back of the prints, for example, associating the print with a particular frame number on a roll of film.

Among the prior art, U.S. Pat. No. 4,629,312 to Pearce et al. describes a photographic printer wherein a roll of photographic material is advanced to and from an exposure station and individual exposure areas of the photographic material are selectively marked by a thermal marking system. U.S. Pat. No. 4,823,163 to Rollet et al. describes an apparatus for marking the back of a photographic proof print with data corresponding to data on the respective negative. U.S. Pat. No. 5,023,655 to Hicks describes another apparatus for printing information on the back of a substantially continuous roll of photographic paper. U.S. Pat. No. 5,984,445 to Morita et al. describes a back-printing mechanism for printing on a non-exposed surface of a photographic material using a print head for jetting a melted ink material onto the back of the print to provide crisp back-prints without adversely affecting the photosensitive front material. U.S. Pat. No. 6,181,409 to Calhoun describes another system for back-printing information such as picture-taking conditions onto the reverse side of a photographic medium.

While conventional, chemically photosensitized photographic media have dominated photography in the past, rapid advances in digital electronics have recently resulted in an explosive growth of digital imaging using digital still and video cameras. A digital camera can be used to capture an electronic image of a scene, typically converting a mosaic of picture elements ("pixels") into a form suitable for storage in a digital memory. The form used for digital storage of the image may be the result of a compression process wherein information for visually redundant or imperceptible features is eliminated. For example, the JPEG standard provides a lossy compression algorithm that eliminates data not substantially contributing to the quality of the image as perceived by an average human viewer.

In addition to the data representing the information required to reconstruct and display the image, other information and data may be associated with and form part of an image file. For example, the EXIF standard, ISO 12234-1 "Photography—Electronic still picture imaging—Part 3: Design rule for camera file system (DCF)", and ISO 12234-4 "Photography—Electronic still-picture imaging—Part 4: Exchangeable image file format (Exif 2.2)" provide for file formats, fields and information associated with a JPEG image including, for example, make and model of camera, date and time of original, date and time digitized, interoperability index, etc. This information may be stored, accessed and displayed by various systems.

BRIEF SUMMARY OF THE INVENTION

According to one aspect of the invention, a method of capturing an image comprises extracting image characterization information from an image file, extracting digital image data from the image file, printing a visually perceptible image described by the digital image data on one side of a sheet medium, printing a visually perceptible representation of the image characterization information on an opposite side of the sheet medium, and retrieving the image characterization information from the visually perceptible representation of the image characterization information on the opposite side of the sheet media.

According to another aspect of the invention, a method of processing an image comprises extracting image characterization information from an image file, extracting digital image data from the image file, printing a visually perceptible image described by the digital image data on one side of a sheet medium; printing a visually perceptible representation of the image characterization information on an opposite side of the sheet medium, and retrieving the image characterization information from the visually perceptible representation of the image characterization information on the opposite side of the sheet media.

According to another aspect of the invention, a printing system comprises a memory storing file data, the data including digital image data and image characterization information, a processor configured for extracting the image characterization information and the digital image data from the file data, and a printer operational in an automatic duplexing mode and configured to print a visually perceptible image described by the digital image data on one side of a sheet medium and print a visually perceptible representation of the image characterization information on an opposite side of the sheet medium.

According to another aspect of the invention, a printing system comprises means for storing file data, the data including digital image data and image characterization information, means for extracting the image characterization information and the digital image data from the file data, and means for operating a print engine for printing a visually perceptible image described by the digital image data on one side of a sheet medium and printing a visually perceptible representation of the image characterization information on an opposite side of the sheet medium.

BRIEF DESCRIPTION OF THE DRAWINGS

FIGS. 2A and 2B are a flow diagram of a method according to an embodiment of the invention; and FIGS. 3A and 3B are a flow diagram of a method according to another embodiment of the invention.

DETAILED DESCRIPTION

Figure 1:
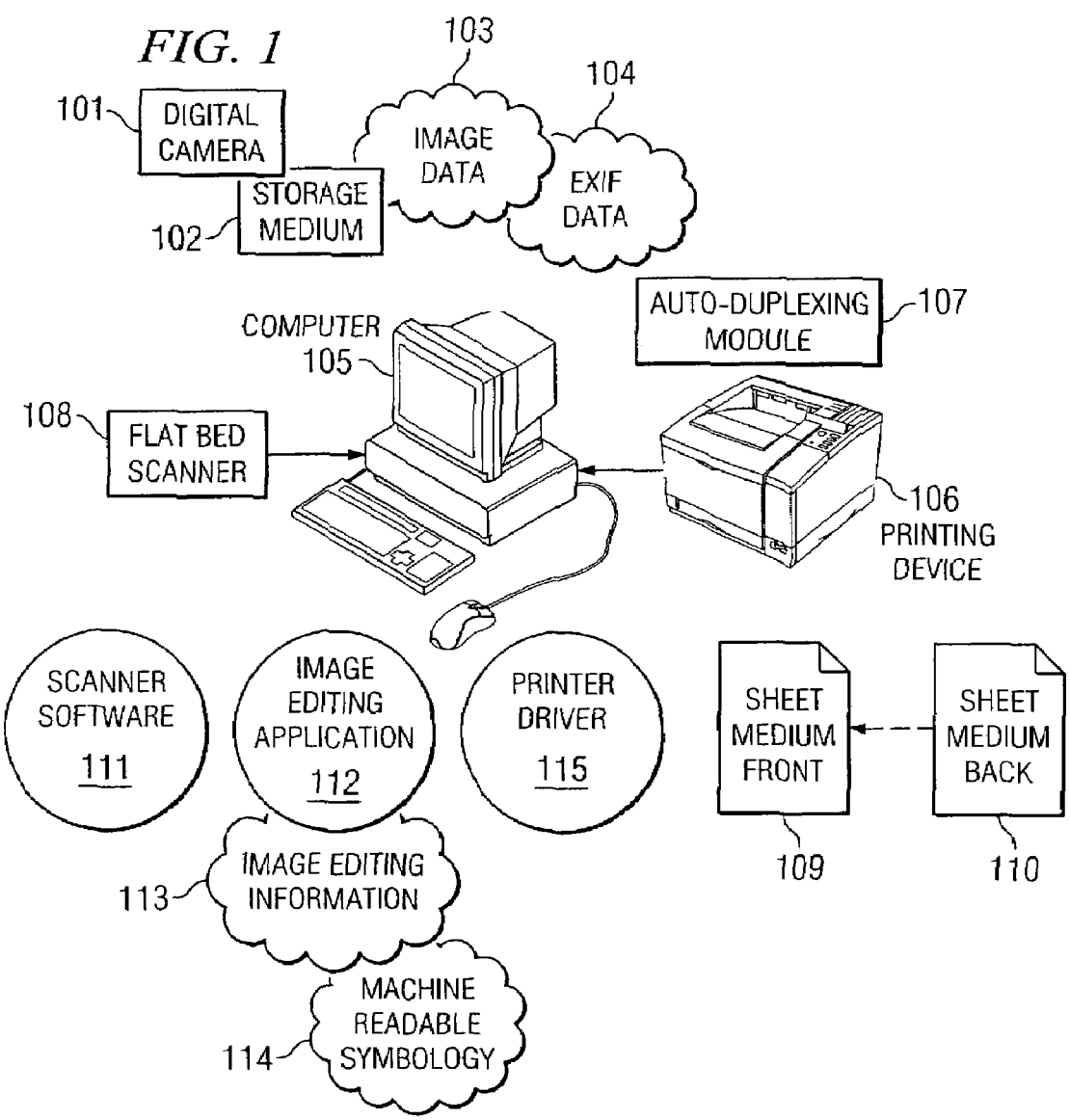
FIG. 1 is a block diagram of a imaging system according to an embodiment of the invention.

Aspects of the invention are directed to a system and method for recording, in association with a printed image, information related to the image. This "image characterization information" may include EXIF data from a digital camera and/or image editing information from an image editing application. The image characterization information may be printed along with the printed image on, for example, the reverse side of a "print" of the image, as a human readable listing of parameter fields and values, as a machine readable barcode, or using some other combination of printed symbology. Preferably, an automatic duplexing feature of a printer may be used to render or print an image on one side of a medium such as a sheet of paper, and then reorient the paper to print the related data i.e., image characterization information, on the reverse side of the sheet of paper using alphanumeric characters or other symbology.

Referring to FIG. 1 depicting a block diagram of one embodiment of the invention, data in the form of digital information is represented by the cloud-shaped figures, hardware by boxes and software by circles. A digital camera 101 includes a storage medium 102 in which is stored digital image data 103 and image characterization information in the form EXIF data 104. To simplify the present explanation, not shown are standard features supporting digital camera hardware 101 including, for example, interface hardware, operating system and image processing software, and related digital information in support of camera operations. Digital camera 101 may be, for example, a HEWLETT PACKARD (HP) PHOTOSMART® digital camera such as the PHOTOSMART® model 120, 320, 620, 720, 812 or 850. Storage medium 102 may include a removable storage medium such as a SMARTMEDIA™ removable NAND flash memory card, a COMPACTFLASH® card, a MEMORY STICK® card or a SD SECURED DIGITAL® memory card providing, for example, 64 megabytes or more of digital data storage. Typically, once digital camera 101 captures an image, image data 103 is stored in storage medium 102 along with camera parameters comprising EXIF data 104.

Digital camera 101 may interface with computer 105 to transfer image data 103 and image characterization information in the form of EXIF 104 using a variety of connections. For example, the data transfer may be supported by a direct electrical connection, such as by provision of a Universal Serial Bus (USB) or FIREWIRE® cable and interface, or by a wireless transmission path. Storage medium 102 may also be physically inserted into an appropriate reader connected to computer 105. Computer 105 may be a conventional personal computer (PC) system running an appropriate operating system and application software or may be a dedicated device such as an information appliance. Conventionally, computer 105 includes a processor executing an appropriate operating system with associated applications and utility software routines. Memory resources, such as a main memory (RAM) and mass storage (for example, magnetic and optical disk drives), input/output (I/O) facilities (for example., I/O controller and associated hardware including keyboard, mouse, or monitor); and related support hardware (for example, communications modems, video and sound processors, or power supply). Printing device 106 may be, for example, a DeskJet 995C or HP LaserJet 4100 dtn printer including automatic duplex printing facilities in the form of auto duplexing module 107 or an HP DeskJet 960C printer with an optional automatic duplex accessory comprising auto-duplexing module 107. Auto duplexing module 107 provides for required paper handling to reposition a print medium for printing on both sides of a sheet of paper or other print-receiving medium.

Flatbed scanner 108 may likewise comprise a wide variety of image digitizing devices such as the HP Photo Scanner 1000, SCANJET® 3500C scanner, SCANJET® 2300c digital flatbed scanner, or SCANJET® 7400c scanner. Flatbed scanner 108 may be coupled to computer 105 using a conventional connection such as a USB, FIREWIRE® or SCSI interface and cable.

Returning to computer 105, various software packages may be installed and run by the processor including scanner software 111 operating to access flatbed scanner 108 and acquire digitized images from the scanner. The acquired images are stored in memory and processed by appropriate software, such as image editing application 112. Image editing application 112 may respond to image editing information 113 to perform appropriate operations and transformations on image data to provide machine readable symbology 114. That is, the image editing applications 112 may be rewritten to include scripting hooks for bi-directional transmission of 'history' steps. Should such hooks exist, a printer driver may then script the application to extract and inject editing steps in the form of 'history' data.

In addition to hardware and software for acquiring images and related data from digital camera 101 and flatbed scanner 108 together with software for image manipulation, for example, imaging editing application 112, computer 105 may include printer driver 115 used to translate displayable information to an appropriate language and protocol for transmission to printing device 106. Printer driver 115 performs this key interface steps to translate a generic print output from an application, such as image editing application 112, to the appropriate proprietary interface used by printing device 106. Thus, print driver 115 may function to implement auto-duplexing supported by auto-duplexing module 107 to print on both sides of a print-receiving medium such as sheet medium front 109 and sheet medium back 110.

A method according to an embodiment of the invention is depicted by the flowchart shown in FIGS. 2A and 2B. At 201, an image is captured by a user of a digital camera. The user pointing the camera at a scene and activating a shutter release button to start a sequence of events culminating in storage of digital imaging data and image characterization information within a digital camera. Thus, at 202, the camera captures an image on a photosensor such as a charged coupled device (CCD) or CMOS device, and stores the captured image, together with the image characterization information (in the form of EXIF captured parameters), in a local memory, such as a random access memory (RAM).

The initial capturing, as represented by 202, may include other camera operations including, but not limited to, focusing of an optical system, capturing of an image on a CCD or CMOS device performing analog-to-digital (A/D) conversion of the CCD output, demosaicing of the image, and, at 203, compression of the image using an appropriate compression routine such as the compression algorithms established by the Joint Photographic Experts Group (JPEG). At 204, EXIF values are added to the compressed image file. The resultant compressed file, in the case of the present example, a JPEG file, is then written to a storage medium at 205.

The images that are stored in the camera at 205 may be transferred either to a computer at 206 or directly to a printer at 213. In the case of transfer to a computer, once transferred, the image is decompressed at 207 and image characterization information, in the form of EXIF data, is extracted from the JPEG file. The digital image data, once decompressed, is then displayed on a monitor of computer 105 at 208 together with the EXIF data using an appropriate image display and/or processing applications, such as ADOBE PHOTOSHOP®. The EXIF data may be displayed as a list of parameters and corresponding values within a window alongside of a window displaying the image.

In response to a print command, the image viewing, editing and/or printing application prepares the image and EXIF data for processing by the printer driver at 209. Thus, at 210, the printer driver renders the image, color maps and processes half tones used by a print event together with the EXIF data to be printed as part of a duplex two page job. At 211, image enhancements as necessary may be applied. Alternatively, or in addition, such enhancements may also be incorporated as part of the processing provided by the image viewing, editing and printing application as part of, or previous to, the preparation at 209. At 212, the image and EXIF data are compressed and sent to the printer for printing.

In those configurations in which the digital camera may interface directly to a printer, actions 214-219, which correspond to those performed by a computer (207-212), may be instead performed by a printer having an application specific integrated circuit (ASIC) or other electronics or circuit for accomplishing those actions. Thus, at 214, the JPEG data may be decompressed to provide digital image data and the associated EXIF data may be extracted from the JPEG file. At 215, if a display is available on or associated with the printer device, the resultant decompressed image may be displayed by the printer using, for example, a liquid crystal display (LCD). Display process 215 may also support certain editing functions such as image cropping, rotation, and color balancing. At 216, the image is prepared for the imaging pipeline including processing of the digital image data and the image characterization information in the form of EXIF data. As previously described, the imaging pipeline includes one or more of compression, decompression, rendering, algorithms, color mapping, and halftoning.

At 217, image enhancements are applied as necessary by the appropriate hardware and software in the printer, independent of driver requirements and functioning. At 218, the image data is rendered, color mapped and half toned while the EXIF data is also prepared as a second page of the duplex job. The resultant data from 218 is provided to the print engine or print head as a two-page job at 219.

At 220, the first page of the job, in the form of rendered image data provided by either 212 or 219, is sent to the print engine. In response, at 221, a sheet of the media, for example, photo printer paper, is picked up and the image is printed on the first side of the sheet. Using the auto-duplexing mode, at 222 this printed sheet is then backed through the duplexer in preparation for printing on the backside of the sheet (i.e., "back-printing"). The EXIF data is then printed on the back of the sheet at 223 and the finished sheet is ejected. The resulting sheet, sheet 224, includes an image printed on one side of the sheet and EXIF data printed on the back of the sheet.

As previously described, the EXIF data is but one example of the type of image characterization information that may be printed on the back of the sheet. Typically, the EXIF data is printed in an appropriate human readable language form using appropriate alphanumeric characters and symbols and/or graphics to present the information to a user. In addition or alternatively, the EXIF data may be provided in machine-readable form such as by an appropriate barcode or similar machine readable and understandable symbology. Barcoding may be performed using conventional barcoding techniques and resources.

FIGS. 3A and 3B are a flowchart of another embodiment of the invention including use of the EXIF data to automatically or manually adjust image parameters or otherwise process an image. Processing may either duplicate processing performed in connection with an original version of an image or provide appropriate processing to match a second or subsequent image to a previously captured image. For example, EXIF data associated with a product image used for a catalog may be recaptured and used to process images of other products to obtain a series of product images having a desired consistent quality or feature as may be specified by one or more parameters expressed by the EXIF data.

Image capture 201 is performed by the user, and actions 202-205 are performed by the digital camera as described with reference to FIG. 2. Similarly, the captured image is transferred to a computer at 206 using an appropriate communications link or by physical transport of a removable storage medium and insertion into a appropriate reader associated with the computer. At 207 and 208, the compressed JPEG image is decompressed, EXIF data extracted, and the image is displayed together with, optionally, the EXIF data on an appropriate display device such as a computer monitor. At 301, the image editing that has been applied to an image is recorded. For example, a sequence of image processing and editing steps performed using an image editing software system, such as PHOTOSHOP®, may be saved as a history for a later application to the original or some other images. At 209, the image, EXIF and editing data are prepared to be supplied to the printer driver. Upon receipt of the image, EXIF and editing data by the printer driver, the images are rendered, color mapped, and half-toned together with the EXIF data and editing data. At 303, this information is then encoded into a barcode format or other machine-readable symbology.

L* analysis of the image is performed at 304. A lower L* value is indicative of a darker portion of the image. L* is the vertical axis in the L*a*b* color space and is analogous to "B" in the HSB space (Hue, Saturation, and Brightness). That is, it functions as a measure of the lightness or darkness of an image and complements hue and chroma information in 3D color space. L* analysis of the image is then mirrored, i.e., left to right transposed as appropriate, to map onto the reverse side of the sheet. Once the mirror image is formed, the symbology in the form of the barcode representing the EXIF and editing data may be positioned "behind" a darkest portion of the image to minimize front-side visibility of the information to be printed on the back of the sheet. At 306, the printer driver compresses the processed image together with the EXIF and editing data, represented by the barcode data and/or any other printed matter, to be included on the back of the sheet and sends the resultant file to the printer.

The printer writing system and duplexing mechanism sends the first page of the print job to the print engine at 220. In response to the data representing the first page, the print engine picks up a sheet and prints the image on the first or front side of the medium, such as paper. At 222, the print sheet is then backed up through the duplexing module in preparation for printing on the backside of the sheet. Then, at 307, the EXIF and editing data, as embodied the barcode data, is printed on the back or reverse side of the media and the finished sheet is ejected. This information may be placed to reduce the likelihood that the printed data on the reverse side will adversely affect the image printed on the front of the sheet. That is, the printed symbology may be hidden behind dark image areas identified in 304. This process that may be performed independent of the absolute amount of ink. For example, since light images use very little ink, intelligent adjustment of symbology lightness as well as spatial positioning of symbology on darker images may be used to avoid adversely affecting either. Again, other data may be included or other forms of the EXIF and/or editing data may be printed on the reverse side of the sheet, such as human readable alphanumeric text representing the various EXIF and editing parameters. The result at 308 is a scanner-readable barcode representing editing data that is printed on the back of the sheet.

Scanner operations for retrieving the printed EXIF data from the printed medium are performed at 309-311. At 309, the barcode is scanned from the back of the sheet by an appropriate scanner. This may be a flatbed scanner such as flatbed scanner 108 in FIG. 1 or another form of scanner such as a hand-held barcode scanner or other input device. Alternatively, a user may read the EXIF data from the back of the sheet and enter the EXIF and/or editing data using a keyboard or other manual input device. At 310, the image editing steps are decoded from the barcode or extracted from other information as input by user. The editing steps are then transferred back to an image editing application via scanner software at 311. This reproduces the image editing history and provides it to the application for reproduction.

At 312, an image editing printing application implements the image editing steps as retrieved and as performed on the original image. The result, at 313, is provision of an identically processed version of an image. Different images may be similarly processed to provide a uniform look among saved images or to duplicate a previous image with respect to certain desired characteristics. Image processing actions may be maintained as a separate file to be applied to an original image file instead of permanently altering the original image file. That is, the original, unaltered image file may be stored together with adjustment parameters rather than altering and resaving the original image data that may then be difficult or impossible to reconstruct or retrieve. For example, it may be desirable to save the original unaltered digital image data to best preserve information fidelity and avoid data loss that may result from intervening image editing.

Although embodiments of the present invention have been described with reference to various steps performed by specific hardware and/or software components, other arrangements may be used. For example, the decoded EXIF data and/or image editing steps recovered from a previously stored image file may be used by a image capture device such as a digital camera, to match parameters of a subsequent picture or series of pictures to that of a previously captured and printed image.

Image characterization information printed on a reverse side of the image bearing medium allow such information to be retained along with the printed image for later retrieval and use apart from and independent of the electronically stored data. Other uses may be envisioned for the image characterization information when provided in the form of a visually perceptible representation on a tangible medium (such as a printed sheet of paper).

What is claimed is:

1. A method of capturing an image comprising: Storing digital image data for said image in an image file; storing image characterization information for said image in said image file, said image characterization information including image processing parameters for said image; extracting said image characterization information from said image file; extracting said digital image data from said image file; printing a visually perceptible image described by said digital image data on one side of a medium, including processing said digital image data based on said image processing parameters of said image characterization information for said image; and printing a visually perceptible representation of said image characterization information on an opposite side of said medium, including positioning said visually perceptible representation of said image characterization information on said opposite side of said medium behind a darkest portion of said visually perceptible image.

2. The method according to claim 1 further comprising:
reading said visually perceptible representation of said image characterization information from said opposite side of said medium; and
printing another visually perceptible image described by said digital image data on one side of another medium, including processing said digital image data based on said image processing parameters of said image characterization information for said image as read from said opposite side of said medium.

3. The method according to claim 1 wherein said digital image data comprises original, unaltered digital image data for said image.

4. The method according to claim 1 wherein said extracting said image characterization information includes:
identifying at least one of a set of image attributes selected from the set consisting of: filename; creation date; modification date: format; width; height; color mode; file size; image description; orientation; resolution; date; time; exposure Lime; f-stop; exposure program; speed rating; EXIF version; data and time of original; date and time digitized; components configuration; compressed bits per pixel; exposure bias value; metering mode; light source; flash; focal length; FlashPix version; color space; pixel dimension; film source; and scene type.

5. The method according to claim 1 further comprising:
repositioning said medium after said printing said visually perceptible image so as to orient said opposite side of said medium in a printing position previously held by said one side.

6. The method according to claim 1 wherein said printing is preformed with a duplexing mode of operation of a printer.

7. The method according to claim 1 wherein said extracting said image characterization information includes:
generating a symbolic representation of said information.

8. The method according to claim 7 wherein said generating said symbolic representation includes:
decoding said image characterization information to provide an alphanumeric representation of said image characterization information.

9. The method according to claim 7 wherein said printing said visually perceptible representation of said image characterization information includes:
printing a machine-readable symbology.

10. The method according to claim 1 wherein said extracting said digital image data includes:
decompressing said digital image data to recover an image stored using a lossy image compression protocol.

11. The method according to claim 1 wherein said printing said visually perceptible image includes:
selectively applying ink onto a surface of said one side of said medium.

12. The method according to claim 1 wherein said printing said visually perceptible representation of said image characterization information includes:
identifying an area on said opposite side which, with respect to a portion of said visually perceptible image on said one side, has reduced chance of causing an objectionable bleed-through.

13. The method according to claim 1 further comprising:
identifying an ink receiving characteristic of said medium and, in response, adjusting a print application process to reduce bleed-through.

14. The method according to claim 1 further comprising: repositioning said medium with respect to a print engine between said steps of printing, wherein each of said printing steps includes a step of operating said print engine.

15. A method of processing an image comprising: extracting digital image data for said image from an image file; extracting image characterization information for said image from said image file, said image characterization information including image processing parameters for said image; printing a visually perceptible image described by said digital image data on one side of a medium, including processing said digital image data by adjusting at least one parameter thereof in response to said image processing parameters of said image characterization information for said image; and printing a visually perceptible representation of said image characterization information on an opposite side of said medium, including positioning said visually perceptible representation of said image characterization information on said opposite side of said medium behind a darkest portion of said visually perceptible image.

16. The method according to claim 15 further comprising: retrieving said image characterization information from said visually perceptible representation of said image characterization information on said opposite side of said medium.

17. The method according to claim 15 wherein said extracting image characterization information includes:
identifying at least one of a set of image attributes selected from the set consisting of: filename; creation date; modification date; format; width; height; color mode; file size; image description; orientation; resolution; date; time; exposure time; f-stop; exposure program; speed rating; EXIF version; data and time of original; date and time digitized; components configuration; compressed bits per pixel; exposure bias value; metering mode; light source; flash; focal length; FlashPix version; color space; pixel dimension; film source; and scene type.

18. The method according to claim 15 further comprising: repositioning said medium after said printing said visually perceptible image so as to orient said opposite side of said medium in a printing position previously held by said one side.

19. The method according to claim 15 wherein said printing is performed with a duplexing mode of operation of a printer.

20. The method according to claim 15 wherein said printing said visually perceptible representation of said image characterization information includes:
identifying an area on said opposite side which, with respect to a portion of said visually perceptible image on said one side, has reduced chance of causing an objectionable bleed-through.

21. The method according to claim 15 further comprising:
identifying an ink receiving characteristic of said medium and, in response, adjusting a print application process to reduce bleed-through.

22. A printing system comprising: a memory storing file data said file data including digital image data and image characterization information, said image characterization information including image processing parameters for said digital image data; a processor configured for extracting said image characterization information and said digital image data from said file data, and processing said digital image data based on said image processing parameters of said image characterization information; and a printer configured to print a visually perceptible image described by said digital image data and said image processing parameters for said digital image data on one side of a medium, and print a visually perceptible representation of said image characterization information is positioned on said opposite side of said medium behind a darkest portion of said visually perceptible image.

23. A printing system comprising: means for storing file data, said file data including digital image data and image characterization information, said image characterization information including image processing parameters for said digital image data; means for extracting said image characterization information and said digital image data from said file data and processing said digital image data based on said image processing parameters of said image characterization information; and means for operating a print engine for printing a visually perceptible image described by said digital image data and said image processing parameters for said digital image data on one side of a medium and printing a visually perceptible representation of said image characterization information on an opposite side of said medium, wherein said visually perceptible representation of said image characterization information is positioned on said opposite side of said medium behind a darkest portion of said visually perceptible image.

* * * * *

UNITED STATES PATENT AND TRADEMARK OFFICE
CERTIFICATE OF CORRECTION

PATENT NO. : 7,372,482 B2
APPLICATION NO. : 10/410676
DATED : May 13, 2008
INVENTOR(S) : Greg S. Smith Page 1 of 1

It is certified that error appears in the above-identified patent and that said Letters Patent is hereby corrected as shown below:

In column 8, line 23, in Claim 4, after "modification date" delete ":" and insert -- ; --, therefor.

In column 8, line 25, in Claim 4, delete "Lime" and insert -- time --, therefor.

In column 10, line 15, in Claim 22, after "data" insert -- , --.

Signed and Sealed this

Fourteenth Day of October, 2008

JON W. DUDAS
*Director of the United States Patent and Trademark Office*